United States Patent [19]

Trowbridge

[11] Patent Number: 4,782,271
[45] Date of Patent: Nov. 1, 1988

[54] ELECTRONIC MOTOR CONTROL CIRCUIT

[75] Inventor: LeRoy N. Trowbridge, Richardson, Tex.

[73] Assignee: Music & Sound, Inc., Dallas, Tex.

[21] Appl. No.: 103,709

[22] Filed: Oct. 2, 1987

[51] Int. Cl.$^4$ .............................................. H02P 7/74
[52] U.S. Cl. ...................................... 318/113; 318/50
[58] Field of Search .................. 318/49, 50, 83, 95, 318/111, 113, 434

[56] References Cited

U.S. PATENT DOCUMENTS

| | | | |
|---|---|---|---|
| 2,805,378 | 9/1957 | Blondet et al. | 318/52 X |
| 2,930,957 | 3/1960 | Cronberger | 318/113 |
| 3,560,816 | 2/1971 | Franzen | 318/52 |
| 4,633,147 | 12/1986 | Posma et al. | 318/113 X |

Primary Examiner—Bentsu Ro
Attorney, Agent, or Firm—John E. Vandigriff

[57] ABSTRACT

A motor control circuit is utilized to monitor and control the power to two series connected 110-120 VAC motors, to detect an imbalance between the operation of the two motors, and to remove the power to both motors if one motor operates in an abnormal manner. A reference voltage is used and compared to the voltage level at the mid connection of the series connected motors.

12 Claims, 2 Drawing Sheets

ELECTRONIC MOTOR CONTROL CIRCUIT

FIELD OF THE INVENTION

This invention relates to motor control circuits and more particular to a circuit for monitoring the operation of two series connected electric motors.

PRIOR ART

Motor control circuits are commonly used for speed control of motors, to power direct current motors with alternating current sources, and to generally control the operation of the motor to suit the requirements of its intended use.

In the application of motors, for example, in vacuum systems, a motor is used that will be powered from a building's electrical power. This may be either a 110-120 VAC or 220-240 VAC source. 110-120 VAC motors are suitable in many application, but when higher power is required, it is necessary to use higher voltage motors such as 220-240 VAC motors. However such motors may be too costly or lack the reliability needed in specific applications.

Motors with control circuits, such as D.C. motors that are powered with control circuits that have an alternating voltage source as its power source, usually do not have sufficient power for many applications, or require costly components to achieve the necessary power output.

In prior art applications, when two motors have been connected in a series combination, the failure or failing operation of one of the motors has resulted in the failing motor presenting a low impedance to the power source subjecting the other motor to an increasing voltage from the power source, greatly stressing the motor and causing over heating or failure of the second motor.

An object of the invention is to overcome the short comings of prior art motor control/monitoring systems and to provide a cost efficient motor control/monitoring circuit.

SUMMARY OF THE INVENTION

The invention defines a control circuit that is interconnected with a pair of series connected motors. Each motor, for example, is rated at 110-120 VAC, and when connected in series, the two motors are connected across a 220-240 VAC power source. The invention finds utility in central vacuum systems where it is necessary to power the vacuum system from the building's source of power in which it is used. To provide adequate power for the vacuum system without having to use larger and generally more expensive 220-240 VAC motors, two less expensive 110-120 VAC motors are use.

In order to provide protection for the motors, a motor control/monitoring system is used to prevent the failing or failure of one motor from causing the failure of the second motor. A bridge circuit is used to compare the voltage at the mid connection between the two series connected motors to a reference voltage, which generally is about one-half the voltage applied across the two motors. When the two voltages, the reference voltage and the mid connection voltage, differ by a preset amount, the power to the two motors is removed and the system turned off.

The system is initially turned on manually by a switch or in some installations, the system power may be turned on when a vacuum line cover is opened to attached the vacuum accesories. The "turning on" of the system causes a pair of relay contacts to close, applying power to the series connected motors. Power is applied to a power transformer that has a center tapped primary winding. The reference voltage is taken from the center tap and applied to a bridge circuit. The mid point of the series connected motors is also connected to the bridge circuit. When the reference voltage differes from the mid point voltage, an imbalance occurs in the bridge circuit producing a voltage which actuates a relay circuit which releases the relay that initially caused voltage to be applied to the series connected motors.

The relays in the control circuit are powered from the secondary of the power transformer that has a center taped primary winding. The secondary winding is applied to a bridge rectifier circuit producing a direct current voltage that is used to actuate the various relays used in the control circuit.

BRIEF DESCRIPTION OF THE DRAWINGS

The objects of the invention as well as the technical advance represented thereby will become apparent to those skilled in the art when taken in conjunction with the following listed drawings and the appended claims.

DESCRIPTION OF THE PREFERRED EMBODIMENT

Figure 1:
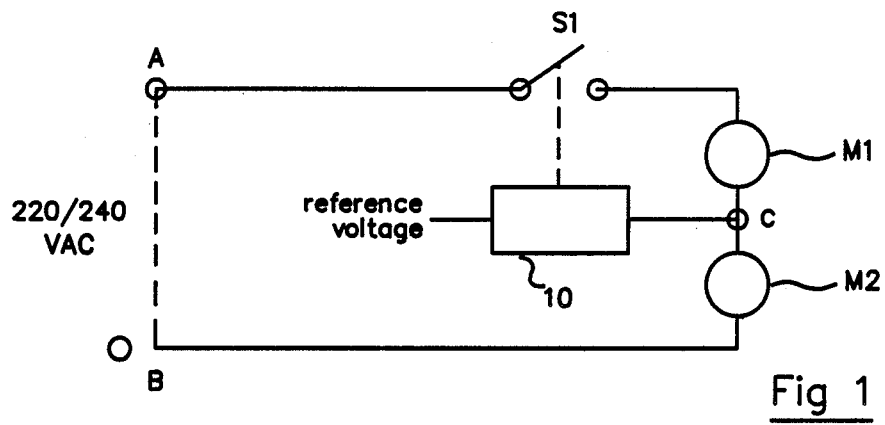
FIG. 1 illustrates a functional block diagram of the invention.

The basic concept of the invention is shown in block form in FIG. 1. Two motors M1 and M2 are connected in series across a 220-240 volt A.C. power line. Power to the motors is controlled by switch S1. Point C, the common connection between the two motors, is connected to a control circuit 10. Control circuit 10, hereinafter described with reference to FIG. 2, monitors the voltage at point C and compares it with a reference voltage. If the voltage at point C differs from the reference by a predetermine amount, then switch S1 is opened by the control circuit and power to the motors is removed.

The voltage at point C will usually differ from the reference voltage when either motor M1 or M2 becomes inoperable or operates in an abnormal way. Removing the power from the motors M1 and M2, prevents further damage to the motors.

Figure 2:
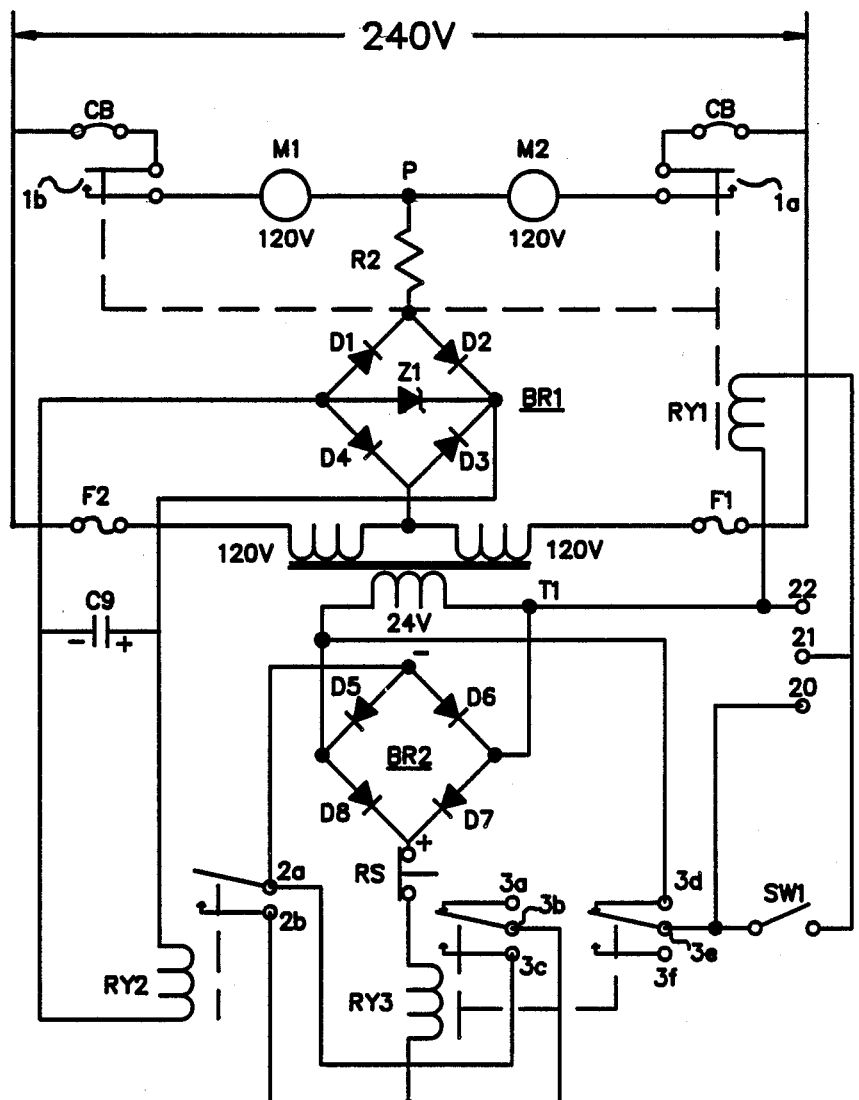
FIG. 2 is a detailed circuit diagram of a preferred embodiment of the invention.

FIG. 2 is a circuit diagram of the preferred embodiment of the invention. Two motors M1 and M2 are connected in series with a pair of relay contacts 1a and 1b, and two thermal protectors CB across a 240 volt A.C. power line. Also connected across the 240 volt line is power transformer T1. Transformer T1 has a center tapped primary winding and 24 volt secondary winding. The 24 volt secondary winding supplied power used to close the relay contacts 1a and 1b and to provide 24 volts to a latching circuit.

Connected to the center tap of the primary winding of transformer T1 is a diode bridge circuit BR1 made up of diodes D1, D2, D3, and D4. A zener diode Z1 is connected across two junctions of bridge circuit BR1. A resistor R2 is connected from bridge circuit BR1 to the common connection point P between motors M1 and M2. Bridge circuit BR1 provides a reference voltage against which the voltage at point P is compared.

A capacitor C1 is also connected across the same junction points BR1 as is zener diode Z1. When the voltage at point P exceeds a predetermine amount, about 35 volts, relay RY2 is actuated for a purpose discussed below.

A second diode bridge circuit BR2 is connected to the 24 volt secondary of transformer T1. Bridge circuit BR2 provides a direct current voltage to power a latching relay RY3 and is made up of Diodes D5, D6, D7, and D8. Connected to the common connection between diodes D7 and D8, marked +, is a reset switch RS. Relay RY3 is connected to one end of reset switch RS and the other end of relay RY3 is connected to the negative junction of bridge BR2 through two different paths. One path is through contacts 2a and 2b of relay RY2 and the other path is through contacts 3b and 3c of relay RY3.

The operation of the circuit of FIG. 2 is basically as follows. When the motors M1 and M2 are to be turned on, switch SW1 is closed completing the circuit to supply power to relay RY1. The circuit path is from switch SW1 to relay RY1 to the 24 volt secondary winding of transformer T1, through relay contacts 3d and 3e, which are normally closed, and back to switch SW1. When power is applied to relay RY1, contacts 1a and 1b close applying power across motors M1 and M2.

In the event one of the motors, M1 or M2, burns out or other wise operates in an improper manner, the voltage at common point P will increase. Since the voltage at common point P is being compared against the reference voltage developed across bridge circuit BR1, a change in voltage at common point P greater that a preset value will cause relay RY2 to actuate closing contacts 2a and 2b.

When contacts 2a and 2b close, latching relay RY3 actuates since the closing of contacts 2a and 2b serve as a switch completing the circuit and connecting one end of relay RY3 to the negative potential side of bridge circuit BR2. Since RY3 is a latching circuit, when contacts 3b and 3c as well as 3e and 3f, the contacts will remain closed until released regardless whether power is being applied to relay RY3 or not. When contacts 3b and 3c are closed, the current path previously closed by contacts 2a and 2b is maintained. This results from the fact that contacts 2a,2b and 3b,3c are electrically connected in parallel.

When relay contacts 3d and 3e are opened, the current path providing power to relay RY1 is opened, deenergizing relay RY1, thus opening contacts 1a and 1b and removing power from across motors M1 and M2.

The control circuit may be reset by actuating reset switch RS. Actuating switch RS releases the latched contacts 3 so that, in the release condition, contacts 3b and 3c are normally open and 3d and 3e are normally closed.

Terminal 20, 21 and 22 are used for remote operation so that the motors may be turned on from a remote location.

Figure 3:
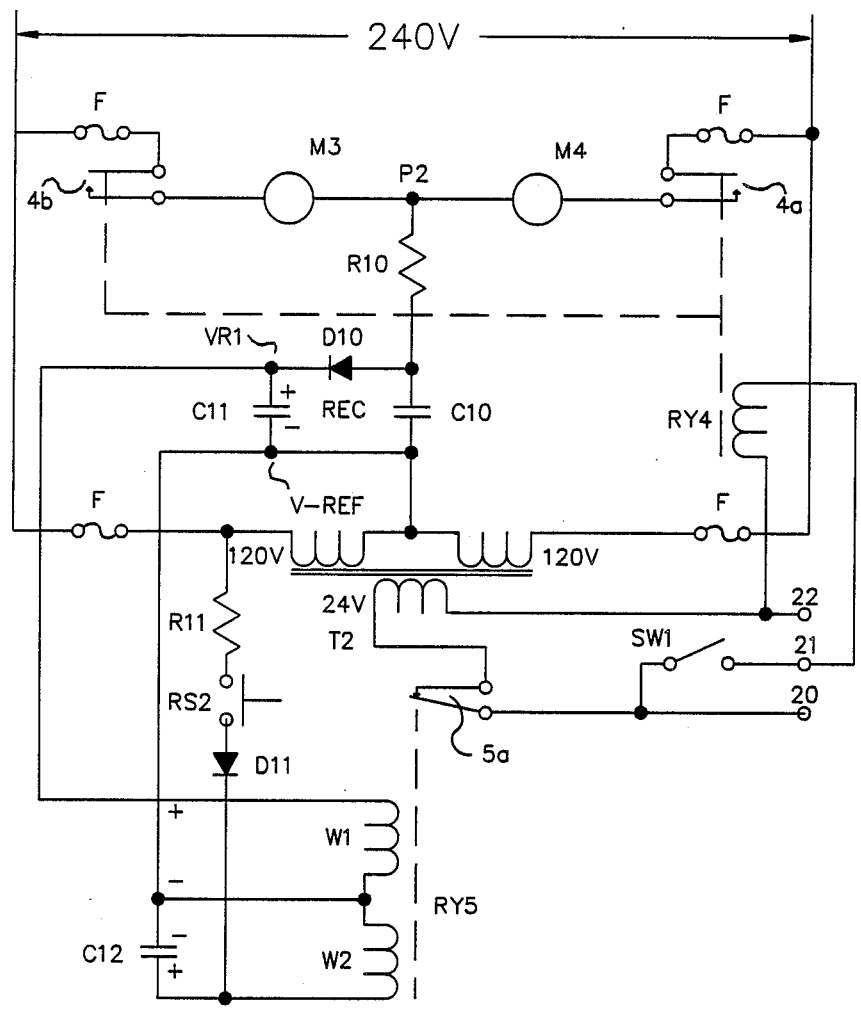
FIG. 3 illustrates a second embodiment of the invention.

FIG. 3 is a circuit diagram of a second embodiment of the invention. Two motors M3 and M4 are connected in series with two pairs of relay contacts 4a and 4b, and two thermal protectors or fuses F across a 240 volt A.C. power line. Also connected across the 240 volt line is power transformer T2. Transformer T2 has a center tapped primary winding and 24 volt secondary winding. The 24 volt secondary winding supplies power used to close the relay contacts 4a and 4b.

A common connection point P2 between series connected motors M3 and M4 under normal operation is at about 120 volts A.C. This common point P2 is connection through resistor R10 to a rectifier circuit comprised of diode D10, Capacitors C10 and C11. The voltage VR1 at the output of the rectifier circuit is compared with a voltage REF generated by a reference voltage circuit as described below.

The secondary winding of T2 is a 24 volt winding and supplies the power to actuated relay RY4 to closed contacts 4a and 4b. When the circuit of FIG. 3 is powered up by closing switch SW1, relay RY4 is actuated closing contacts 4a and 4b. Also connected to the 24 volt secondary winding is a pair of contacts 5a which are in a normally closed position. Contacts 5a are associated with and actuated with a latching relay RY5. Latching relay has two windings W1 and W2. These windings are wound so that when power is applied to the relay, the magnetic fields of the winding are opposing each other. The two windings are series connected and the common connection point of the two windings are connected to the rectifier circuit REC made up of diode D10 and capacitors C10 and C11. This common connection is identified as REF. The end of winding W1 not connected to winding W2 is connected to the output VR1 of rectifier REC.

A second rectifier circuit made up of diode D11 and capacitor C12 is connected to the end of winding W2 that is not common to winding W1. Connected to and in series with the rectifier circuit is a reset switch RS2. Reset switch RS2 is use to release latching relay when it is in the latched position with contacts 5a in an open position. Contacts 5a are normally closed.

The operation of the circuit of FIG. 3 is basically as follows. When the motors M3 and M4 are to be turned on, switch SW1 is closed completing the circuit to supply power to relay RY4. The circuit path is from switch SW1 to relay RY4 to the 24 volt secondary winding of transformer T2, through relay contacts 5a, which are normally closed, and back to switch SW1. When power is applied to relay RY4, contacts 4a and 4b close applying power across motors M3 and M4.

In the event one of the motors, M3 or M4, burns out, or other wise operates in an improper manner, the voltage at common point P2 will increase. Since the voltage at common point P2 is being compared against the reference voltage REF, a change in voltage at common point P2 greater that a preset value will cause relay RY5 to actuate, opening contacts 5a. Since contacts 5a are in series with relay RY4, power is removed from relay RY5, contacts 4a and 4b are opened and power is removed from motors M3 amd M4.

Relay RY5 is actuated when the voltage VR is different from reference voltage REF by a predetermined amount. The predetermined difference voltage across winding W1 of relay RY5 actuates relay RY5 and opens normally closed contacts 5a.

Relay RY5 is a latching relay so that contacts 5a will remain closed until released. Relay RY5 is released by pressing release switch RS2. When RS2 is pressed, current flows through resistor R11, diode D11 and the relay release winding W2. Relay RY5 has a permanent magnet that holds the relay in a latched condition. Current through winding W2 produces sufficient magnetic field to over come the permanent magnetic field holding the relay in the latched condition and releases the relay, closing contacts 5a. Terminals 20, 21 and 22 as well as switch SW1 serve the same function as they do in FIG. 2.

What is claimed:

1. A control circuit for two series connected motors, comprising the combination of two motors connected in series across a power source including a common connection point, a reference circuit providing a reference voltage and including a circuit for comparing the reference voltage and a voltage at said common connection point, a first relay having a pair of contacts through which a voltage from said power source is applied to said series connected motors, and a second relay for removing power from said first relay when the reference voltage and said voltage at said common connection point differ by a preset amount.

2. The control circuit according to claim 1 including a latching relay and a reset switch, said latching relay maintaining said first relay in a deenergized condition until said reset switch is actuated.

3. The control circuit according to claim 1 including a first diode bridge circuit across which said reference voltage is produced and across which said reference voltage is compared with said voltage at said common connection point.

4. The control circuit according to claim 2 including a second circuit having a bridge circuit for providing a D.C. power source for energizing said latching relay.

5. The control circuit according to claim 1, including an RC delay time constant to prevent instantaneous differences between said reference voltage and said voltage at said common connection point from removing power from said motors.

6. The control circuit according to claim 1, wherein said reference voltage is approximately one half the value of the power source.

7. The control circuit according to claim 1, wherein said preset amount is approximately 35 volts.

8. The control circuit according to claim 1, wherein said first relay has two pairs of contacts, one pair connected to one motor and the other pair connected to the other of said two series connected motors for removing power from said series connected motors when power is removed from said first relay.

9. A control circuit for two series connected motors, comprising the combination of two motors connected in series across a power source including a common connection point, a reference circuit providing a reference voltage and including a circuit for comparing the reference voltage and a voltage at said common connection point, a first relay having a pair of contacts through which a voltage from said power source is applied to said series connected motors, and a second relay having set and reset windings for removing power from said first relay when the reference voltage and said voltage at said common connection point differ by a preset amount.

10. The control circuit according to claim 9 wherein said second relay is a latching relay and has a permanent magnet to hold the relay in a latched position.

11. The control circuit according to claim 10 wherein said reset winding is energized to overcome the magnetic field of the permanent magnet to release the relay from the latched position.

12. The control circuit according to claim 9 including a reset circuit comprised of a diode for suppling a direct current and a reset switch, which when pressed supplies current to the reset winding of said second relay to release the second relay.

* * * * *